(12) United States Patent
Takada et al.

(10) Patent No.: US 6,423,440 B1
(45) Date of Patent: *Jul. 23, 2002

(54) CLOSED BATTERY AND CLOSING MEMBER

(75) Inventors: Akiyoshi Takada, Shiga; Kinji Saijo, Yamaguchi; Kazuo Yoshida, Yamaguchi; Nobuyuki Yoshimoto, Yamaguchi; Yoshihiko Isobe, Yamaguchi, all of (JP)

(73) Assignees: Toyo Kohan Co., Ltd., Tokyo; Fukuda Metal Foil & Powder Co., Ltd., Kyoto, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,488

(22) Filed: Nov. 9, 1999

Related U.S. Application Data

(63) Continuation-in-part of application No. PCT/JP98/02053, filed on May 8, 1998.

(51) Int. Cl.⁷ .............................................. H01M 2/12
(52) U.S. Cl. ........................................... 429/82; 429/56
(58) Field of Search ................................ 429/53–57, 82

(56) References Cited

U.S. PATENT DOCUMENTS

| 4,803,136 A | * | 2/1989 | Bowsky | ...................... 429/56 |
| 5,741,606 A | * | 4/1998 | Mayer | .......................... 429/53 |

FOREIGN PATENT DOCUMENTS

| JP | 62-097256 | 5/1987 |
| JP | 05-314959 | 11/1993 |
| JP | 07-105933 | 4/1995 |
| JP | 07-254402 | 10/1995 |

* cited by examiner

Primary Examiner—Gabrielle Brouillette
Assistant Examiner—Mark Ruthkosky
(74) Attorney, Agent, or Firm—Browdy and Neimark

(57) ABSTRACT

The object of the present invention is to provide a closed battery capable of rapidly releasing the internal pressure thereof and at the same time disconnecting the current to effectively prevent itself from temperature rising and exploding so that in such a completely closed battery it may assure the safety and reliability thereof, when the internal pressure is elevated due to short circuit, overcharge, reverse charge, or the like. A valve element 5 is provided with a slit 3 between the circumference thereof and a metal substrate 1. When the internal pressure of a battery is elevated, the valve element 5 is smoothly raised up together with a metal foil 2 from a bending fulcrum portion 4 to thereby cut a lead wire 6 or permit a braze portion 8 to detach from the lead wire 6, thus disconnecting the current reliably. Then, the metal foil which usually closes the slit formed around the circumference of the valve element 5 is allowed to burst stably and accurately at a prescribed pressure to thereby form a valve opening portion 7 so that the internal gas of the battery can be discharged.

10 Claims, 4 Drawing Sheets

CLOSED BATTERY AND CLOSING MEMBER

The present application is a continuation in part under of copending parent application no. PCT/JP98/02053, filed May 8, 1998, the entire contents of which being hereby incorporated herein by reference.

DETAILED DESCRIPTION OF THE INVENTION

1. Field of the Invention

The present invention relates to a closed battery capable of bursting at a prescribed pressure, especially at a low pressure, to rapidly release the internal pressure and at the same time to break the current, when the temperature or internal pressure of the battery is elevated, and to a closing member for use in the closed battery.

2. Prior Art

Recently, with increasing requirement of electronic devices that are made much smaller in size, light weight and have enhanced performance, the use of non-aqueous batteries with high energy density has become popular. Batteries which use an alkaline metal such as lithium, sodium, or potassium as an active material of negative electrode thereof employ battery containers of completely closed structure because the alkaline metal easily acts with water.

Such a complex closed battery has a merit of storability, but has the disadvantage in that its high sealability sometimes causes rupture of the battery itself due to the abnormally elevated internal pressure thereof in cases where the battery is exposed to high temperature, or a short circuit is formed inside or outside of the battery to cause a large flow of the current, or hydrogen gas is generated in the battery due to water contamination during in the manufacturing process thereof. In such a case, the device that has installed such a rupturing battery will be broken and moreover, there may be a danger of the broken device and battery harming the user. Accordingly, there should be a request for some pressure releasing mechanism before the internal pressure of the battery is increased to such a high extent as to cause rupture.

So far, several methods for releasing the internal pressure of a battery have been proposed and some of them have been used in practice. For instance, Japanese laid-open publication HEI 2-304861 discloses a safety valve for a battery, which comprises a valve chest provided at one part of the container of the battery and having a valve through hole to be communicated with the inside of the battery and an outlet to be communicated with the outside, the valve chest comprising a valve member at least whose surface opposed to the valve through hole is made of rubber, and an elastic member for pushing the above mentioned rubber surface of the valve member to the valve through hole. This safety valve holds the sealability of the battery by closing the valve through hole with the rubber-made valve member, and prevents the internal pressure of battery from rising in excess of a prescribed pressure by permitting the valve through hole to be opened when the internal pressure rises to the pressure prescribed for the elastic member.

Such a conventional safety valve has been widely used in Ni—Cd type batteries. However, it has not yet been used in the non-aqueous batteries which employ alkaline metals as the active material of the negative electrode, since, it is impossible to obtain such a high sealability as required for the non-aqueous batteries even if the elastic member presses the valve member to the valve through hole to thereby close the battery.

One of the methods for releasing the internal pressure of a battery which requires high sealability is disclosed in Japanese laid-open publication SHO 63-285859. In this method, the container of the battery is provided with a thinned portion at one part of its wall. This thinned portion is formed by cold rolling a sheet of the container using a press device until the thickness of the rolled portion of the sheet becomes half of the initial thickness thereof. Thus, the battery is provided with good sealability with regard to this thinned wall portion because it is only transformed from a part of the continuous wall of the container.

Another pressure releasing mechanism of this type is disclosed in Japanese laid-open publication HEI-6-215760. This releasing mechanism comprises a valve diaphragm fitted in an open end of the cylindrical container of a battery having a bottom and disposed above the electrode element of the battery, and a lead for breaking current disposed above the valve diaphragm. In this structure, when the internal pressure of the battery is elevated, the valve diaphragm is expanded to rupture the lead for breaking current to cut the current.

Problem to be Solved by the Invention

According to the method as disclosed in Japanese laid-open publication SHO-63-285859, it is necessary to obtain a thinned wall portion of the container so that the thinned portion can be ruptured at a relatively low pressure. However, when the wall portion is made too thinned, there may be formed fine or minute cracks during press-forming, thus impairing the sealability of the battery container.

Further, when metals are processed by cold working, they inevitably develop a work hardening problem. However, the hardening of the metals does not always take place uniformly, and therefore, there arises a problem that the operating pressure for such pressure releasing mechanism cannot regularly be controlled. There has been further proposed a half-etching method for making a thinner part of the wall of a battery container. It is extremely difficult to control the remaining thickness of the thinned portion after etching, and also difficult to obtain a good yield. Another problem is that the half-etched portion cannot be free from the formation of pinholes, and therefore, all the products need to be inspected.

On the other hand, according to the method as disclosed in Japanese laid-open publication HEI-6-215760, it is necessary to accurately control the depth of the cut portion formed in the lead. This is a severe problem in view of its working process. Another problem is that the current is not reliably broken at a prescribed pressure.

With the view to solving the conventional drawbacks as mentioned above, it is an object of the present invention to provide a closed battery incorporating a valve chip which can be stably and accurately burst at a prescribed pressure, especially at a low pressure, so as to release the internal pressure thereof and which can be manufactured easily, and also to provide a closing member for use in said closed battery.

Means for Solving the Problem

The present invention provides a closed battery which is comprised of an electrode element consisting of a positive electrode, a negative electrode, and a separator; an electrolyte; a battery vessel accommodating said electrode element together with said electrolyte; and a closing member fitted in the inner periphery of an open end portion of said battery container to close the open end portion of the battery container, wherein said closing member consists of a metal substrate, a valve element which is provided in said metal substrate so as to serve as a releasing chip such that when the internal pressure of the battery is elevated, the valve element is bent from a bending fulcrum so as to provide the metal substrate with an opening portion for releasing the internal pressure, and a metal foil which is adhered to the inner surface of the metal substrate, wherein said valve element is provided with a slit between the circumference thereof and the metal substrate, and provides a closing member for use in said closed battery.

According to the present invention, when the internal pressure of a battery is elevated due to short circuit, overcharge, reverse charge, or the like, a valve chip consisting of a metal substrate in which a valve element is provided for releasing the internal pressure of the battery, and a metal foil which has a uniform and accurate thickness and is laid over the metal substrate so as to close a through hole which is usually closed with the valve element, operates to transform itself and push and raise the valve element which is provided with a slit around the circumference thereof. When the valve chip is electrically disconnected and the internal pressure reaches to a prescribed pressure, the valve element is smoothly raised up owing to the formation of the slit and the metal foil bursts stably and accurately to discharge the internal gas of the battery so that an abrupt rising of the internal temperature or rupture of the battery can previously be prevented.

Preferred Embodiment

The present invention is now explained in conjunction with preferred embodiments and examples referring to the drawings. FIG. 1 is a vertical section view showing an upper part of a completely closed battery of the present invention. FIG. 2 is a plane view showing a valve chip of the closed battery of the present invention. FIG. 3 is a vertical section view showing the above mentioned valve chip. FIG. 4 and FIG. 5 are explanatory views showing operating manners of the valve chip in case of abnormality. FIG. 6 and FIG. 7 are plane views showing other embodiments of the valve chip.

In FIG. 1, a cylindrical battery container 30 having a bottom, which serves as a negative electrode terminal, accommodates an electrode element 32 together with an electrolyte which is isolated from the outside. The electrode element 32 is constituted of a coiled laminate which comprises a positive electrode 32a, a separator 32b, and a negative electrode 32c disposed opposite to the positive electrode 32a via the separator 32b.

A closing cap 33 having through holes 0 and 0 which serves as a rupture-preventing mechanism and at the same time as a positive electrode terminal is fitted by calking in the upper open end portion of the container 30 via an insulating gasket 34. Above the electrode element 32, a saucer-like inner cap 37 is disposed and a gas release hole of a large diameter 35 is provided at the center portion of the inner cap 37.

Between the inner cap 37 and the closing cap 33, a valve chip V which forms a closing member for enclosing the electrode element and others is provided. A periphery 36 of the valve chip V is in contact with a periphery 33a of the closing cap 33. These peripheries 36 and 33a are fixed by calking in a circumference 37a of the inner cap 37 via an insulating gasket 40.

A lead wire 6 is attached, by an appropriate means, to an inner surface of the valve chip V serving as the closing member for closing the upper open end portion of the battery. The lead wire 6 extends to the positive electrode 32a of the electrode element 32.

As shown in FIG. 2 and FIG. 3, the valve chip V is a substantially circular in a plane view and is composed of a metal substrate 1 having a circular form and a metal foil 2 adhered to the inner surface of the metal substrate 1. As a material of the metal substrate 1, any one selected from the group including a steel sheet, stainless steel sheet, copper sheet, and aluminum sheet may be used. As a material of the metal foil 2, any one selected from the group including a steel foil, stainless steel foil, copper foil, aluminum foil, nickel foil, and nickel-iron alloy foil may be used.

Slit 3, having a substantially circular width is formed in the metal substrate 1 such that the circular slit 3 entirely penetrates through the metal substrate in its thickness direction, though the above mentioned circular line partly leaves a non-slitted portion which forms a bending fulcrum portion 4. The inner portion defined by the slit 3 is formed as a valve element 5 which is to operate as a pressure releasing chip for releasing the internal pressure of the battery when the internal pressure is elevated. When the valve element 5 is raised up from the metal substrate from the bending fulcrum portion 4, a valve opening portion 7 will be formed so as to release the internal pressure of the battery. (See FIG. 5.) The lead wire 6 is attached to the metal foil 2 through a braze portion 8, for instance.

Next, the operating manner of the valve chip in case of abnormality is explained. Now, a gas decomposed from the electrolyte of a battery is generated due to overcharge or the like, which raises the internal pressure of the battery. In this case, since the valve chip V is provided with the slit 3, the valve element 5 is smoothly raised up together with the metal foil 2 from the bending fulcrum portion 4, as shown in FIG. 4, to thereby permit the braze portion 8 to be detached from the lead wire 6, thus reliably disconnecting the current. Then, a part of the metal foil 2 corresponding to the slit 3 having a width bursts to thereby form the valve opening portion 7 so that the internal pressure is released outside. The gas generated from the electrolyte passes through the valve opening portion 7 and is discharged from the through holes 0 of the closing cap 33.

Incidentally, the form of the valve element is not necessarily limited to the substantially circular form as shown in FIG. 2, but the valve element may be one as denoted by 10 in FIG. 6, which is provided with an arm portion 4a at the bending fulcrum portion 4, or may be one as denoted by 11 in FIG. 7, whose form is tongue-like.

According to the valve elements of the embodiments as shown in FIG. 2 and FIG. 6, the slit width W is preferably 0.1 to 0.4 D where D is a diameter of the valve element 5, and according to the valve element of the embodiment as shown in FIG. 7, the slit width is preferably 0.1 to 0.4 D where D is the width of the valve element 11. Namely, the width of a slit formed around the circumference of the valve element is preferably 10 to 40% of the diameter or width of the valve element.

Thus, with the slit provided around the circumference of the valve element, when the internal pressure of a battery is elevated, the valve element can smoothly be raised up without friction between an end wall 1a of the slit on the metal substrate side and the other end wall 5a of the slit on the valve element side (FIG. 3) because the circumferential slit portion of the valve element is supported by the metal foil alone.

According to the composition of the present invention, in a completely closed battery, thanks to the slit 3 formed around the circumference of the valve element 5, when the internal pressure of the battery is elevated due to some abnormality such as short circuit, overcharge, or reverse charge, the valve element 5 is smoothly raised up together with the metal foil 2 from the bending fulcrum portion 4, as shown in FIG. 4, to thereby permit the braze portion 8 to be detached from the lead wire 6, thus disconnecting the current reliably. Then, a part of the metal foil 2 corresponding to the slit 3 having a width bursts to thereby form the valve opening portion 7 so that the internal pressure is released outside. The gas generated from the electrolyte passes through the valve opening portion 7 and is discharged from the through holes 0 of the closing cap 33.

As illustrated in FIG. 5 for explaining the operating manner of the valve chip, once any case needs the valve chip to operate, it permits the valve opening portion 7 to be formed to thereby release the internal gas of the battery. Thus, the battery can previously be prevented from the abrupt rising of the internal temperature or an explosion thereof.

The operating pressure for the valve chip can be controlled by manufacturing the metal foil with the highest accuracy of its thickness in micron order. Further, the operating pressure can be predetermined within a stable pressure range by selecting the material composition of the valve chip and adjusting the length of the bending fulcrum portion 4.

Effect of the Invention

According to the safety valve chip of the present invention, when the internal pressure of a battery is elevated due to short circuit, overcharge, reverse charge, or the like, and at the time when it reaches to a prescribed pressure, the valve element can smoothly be raised up and the metal foil which usually closes the slit formed around the circumference of the valve element is allowed to burst stably and accurately even at a low pressure so as to release the internal gas of the battery. Thus, the battery can previously be prevented from the abrupt rising of the temperature or an explosion thereof.

EXPLANATION OF REFERENCE CHARACTERS

Figure 1:
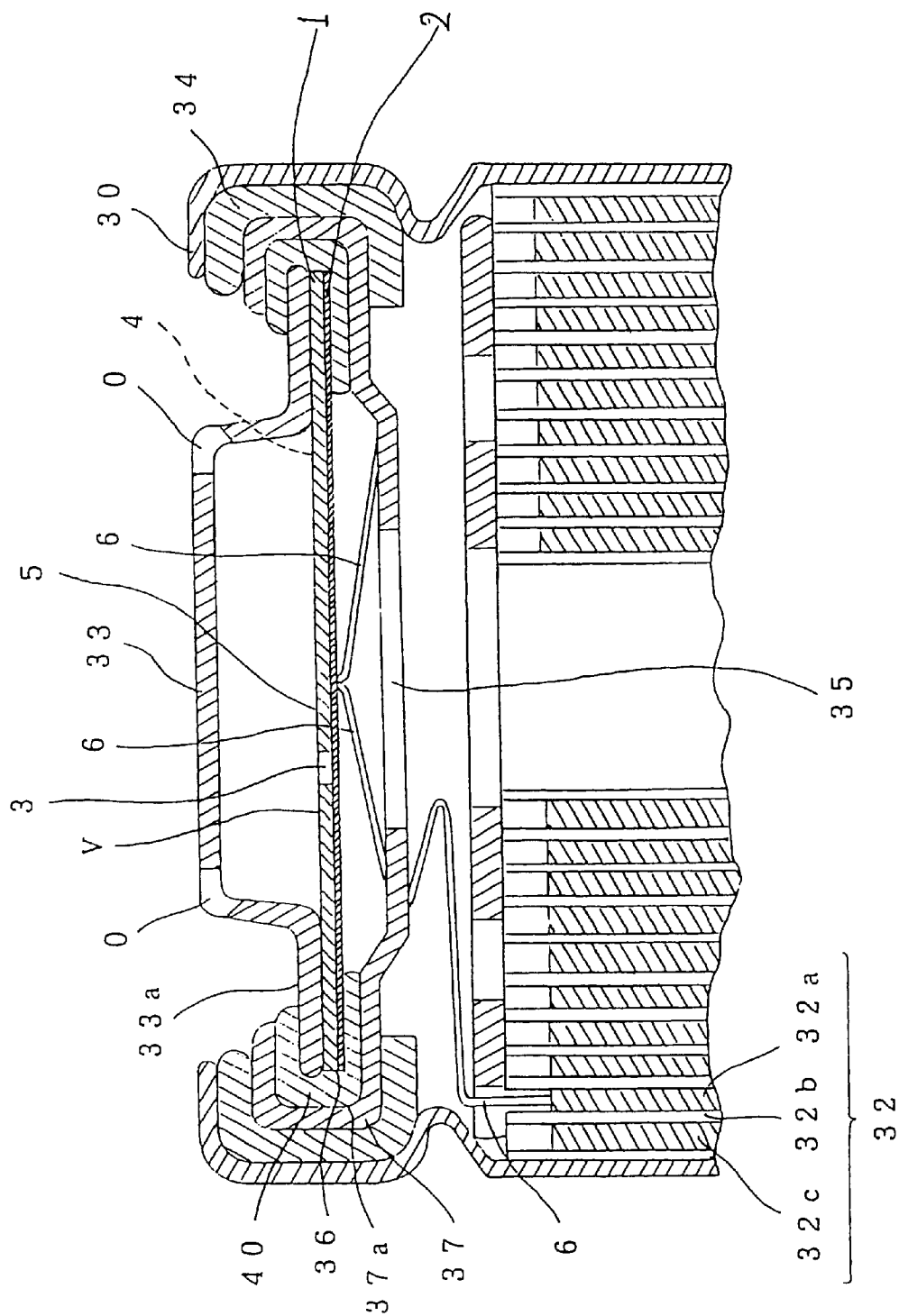
FIG. 1 is a vertical section view showing an upper part of the completely closed battery according to the present invention.
Figure 2:
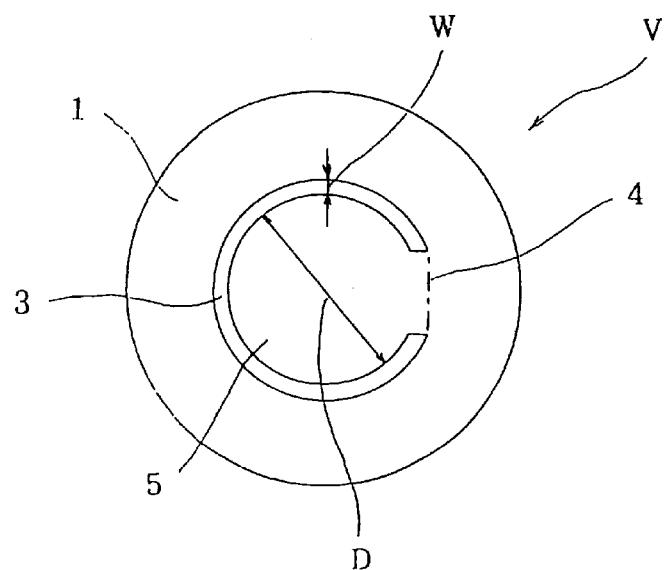
FIG. 2 is a plane view showing the valve chip according to the present invention.
Figure 3:
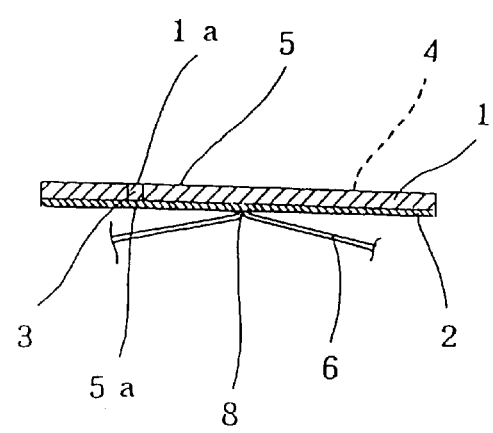
FIG. 3 is a vertical section view showing the valve chip according to the present invention.
Figure 4:
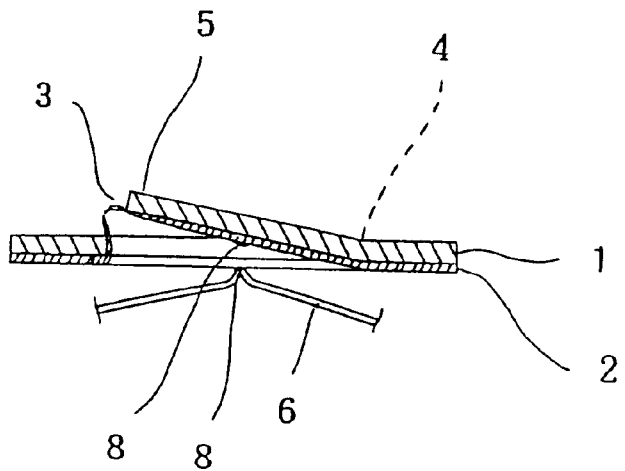
FIG. 4 is an explanatory view showing the operating manner of the valve chip in case of abnormality.
Figure 5:
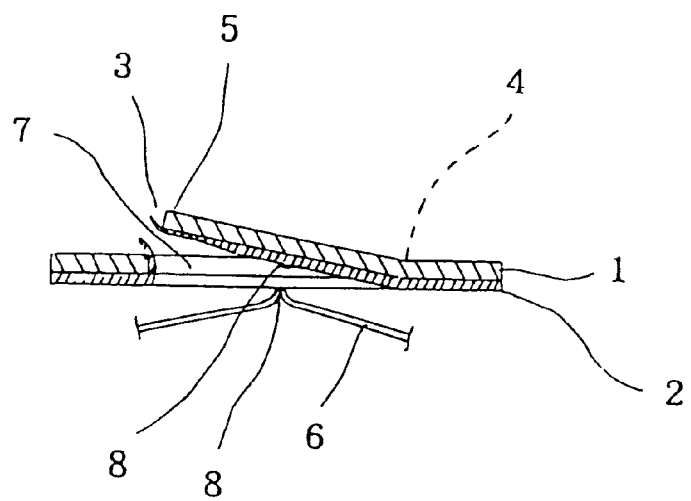
FIG. 5 is another explanatory view showing the operating manner of the valve chip in case of abnormality.
Figure 6:
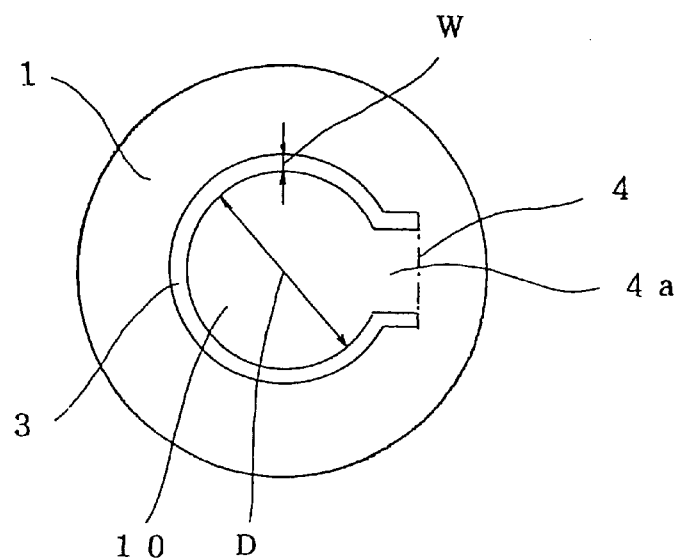
FIG. 6 is a plane view showing another embodiment of the valve chip according to the present invention.
Figure 7:
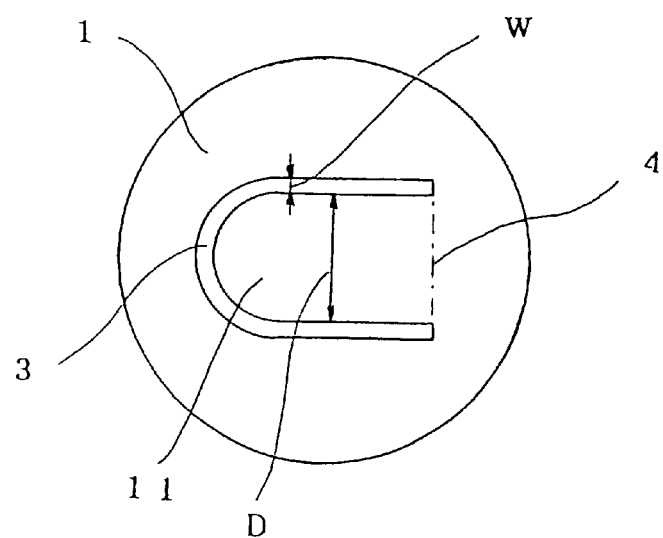
FIG. 7 is a plane view showing still another embodiment of the valve chip according to the present invention.

1: metal substrate
2: metal foil
3: slit
4: bending fulcrum portion
5: valve element
6: lead wire
7: valve opening portion
8: braze portion

What is claimed is:

1. A closed battery comprising: an electrode element consisting of a positive electrode, a negative electrode, and a separator; an electrolyte; a battery container accommodating said electrode element together with said electrolyte; and a closing member fitted in the inner periphery of an open end portion of said battery container to close the open end portion of the battery container, wherein said closing member consists of a metal substrate, a valve element which has a tongue-shaped format and which is provided in said metal substrate so as to serve as a releasing chip such that when the internal pressure of the battery is elevated, the valve element is bent from a bending fulcrum so as to provide the metal substrate with an opening portion for releasing the internal pressure, by bursting a metal foil which is adhered to the inner surface of the metal substrate, wherein said valve element is provided with a slit between the circumference thereof and the metal substrate, wherein said slit, comprising the opening portion of the metal substrate and the metal foil which seals the opening portion, has a width equal to 10 to 40% of the inside diameter of the valve element.

2. A closed battery according to claim 1, wherein said valve element has a substantially circular form and the bending fulcrum is provided with an arm portion.

3. A closed battery according to claim 1, wherein said metal foil is connected with a lead member for conducting current from said electrode element to a closing cap, and when said valve element operates to release the internal pressure, the said lead member is electrically disconnected from the metal foil to break the current.

4. A closed battery according to claim 1, wherein said metal substrate is made of any one selected from the group including a steel sheet, stainless steel sheet, copper sheet, and aluminum sheet.

5. A closed battery according to claim 1, wherein said metal foil is selected from the group consisting of steel foil, stainless steel foil, copper foil, aluminum foil, nickel foil, and nickel-iron alloy foil.

6. A closing member consisting of a metal substrate, a valve element which is provided in said metal substrate so as to serve as a releasing chip such that when the internal pressure of the battery is elevated, the valve element is bent from the bending fulcrum so as to provide the metal substrate with an opening portion for releasing the internal pressure by bursting a metal foil which is adhered to the inner surface of the metal substrate, wherein said valve element is provided with a slit between the circumference thereof and the metal substrate, wherein said slit, comprising the opening portion of the metal substrate and the metal foil which seals the opening portion, has a width equal to 10 to 40% of the inside diameter of the valve element.

7. A closing member according to claim 6, wherein said valve element has a substantially circular form and the bending fulcrum is provided with an arm portion.

8. A closing member according to claim 6, wherein said metal foil is connected with a lead member for conducting a current from the electrode element to a closing cap, and when said valve element operates to release the internal pressure said lead member is electrically disconnected from the metal foil to break the current.

9. A closing member according to claim 6, wherein said metal substrate is selected from the group consisting of steel sheet, stainless steel sheet, copper sheet, and aluminum sheet.

10. A closing member according to claim 4, wherein said metal foil is selected from the group consisting of steel foil, stainless steel foil, copper foil, aluminum foil, nickel foil, and nickel-iron alloy foil.

\* \* \* \* \*